US009276483B2

(12) United States Patent
Yang et al.

(10) Patent No.: US 9,276,483 B2
(45) Date of Patent: Mar. 1, 2016

(54) CONTROL CIRCUIT FOR ACTIVE-CLAMP FLYBACK POWER CONVERTER WITH PROGRAMMABLE SWITCHING PERIOD

(71) Applicant: SYSTEM GENERAL CORPORATION, New Taipei (TW)

(72) Inventors: Ta-Yung Yang, Milpitas, CA (US); Yen-Ming Liu, Shetou Township, Changhua County (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 0 days.

(21) Appl. No.: 14/315,594

(22) Filed: Jun. 26, 2014

(65) Prior Publication Data

US 2015/0003121 A1   Jan. 1, 2015

Related U.S. Application Data

(60) Provisional application No. 61/840,073, filed on Jun. 27, 2013.

(51) Int. Cl.
*H02J 3/12* (2006.01)
*G05F 1/00* (2006.01)
*H02M 3/335* (2006.01)
*H02M 1/34* (2007.01)

(52) U.S. Cl.
CPC .... *H02M 3/33569* (2013.01); *H02M 2001/342* (2013.01)

(58) Field of Classification Search
USPC ......... 323/239, 242, 243, 246, 270, 274, 275, 323/284, 285; 363/21.13, 21.15–21.18, 363/56.12, 78, 79
See application file for complete search history.

(56) References Cited

U.S. PATENT DOCUMENTS

| 5,570,278 | A | 10/1996 | Cross | |
|---|---|---|---|---|
| 6,069,803 | A | 5/2000 | Cross | |
| 7,006,364 | B2* | 2/2006 | Jin et al. | 363/21.01 |
| 7,193,867 | B2* | 3/2007 | Aso | 363/24 |
| 7,382,633 | B2* | 6/2008 | Aso et al. | 363/21.04 |
| 7,903,440 | B2* | 3/2011 | Yang | 363/89 |
| 8,009,448 | B2* | 8/2011 | Liu | 363/56.12 |
| 8,488,348 | B2* | 7/2013 | Hong et al. | 363/56.12 |
| 8,582,326 | B2* | 11/2013 | Hosotani et al. | 363/21.13 |
| 8,587,964 | B2* | 11/2013 | Yang et al. | 363/21.02 |
| 8,693,223 | B2* | 4/2014 | Lin | 363/56.12 |
| 2011/0305048 | A1* | 12/2011 | Yang et al. | 363/21.03 |

* cited by examiner

*Primary Examiner* — Adolf Berhane
*Assistant Examiner* — Gary Nash
(74) *Attorney, Agent, or Firm* — McClure, Qualey & Rodack, LLP

(57) ABSTRACT

A method for controlling an active-clamp flyback power converter is provided. The method includes comprises: generating a switching signal in response to a feedback signal for switching a low-side transistor and regulating an output of the active-clamp flyback power converter; generating an active-clamp signal after the switching signal is disabled; generating a hysteresis bias to adjust the feedback signal; and generating a pulse signal periodically to enable the switching signal. The low-side transistor is coupled to switch a transformer. The switching signal is coupled to drive the low-side transistor. The active-clamp signal is coupled to drive a high-side transistor. A pulse width of the active-clamp signal is determined by a first resistor. The high-side transistor is connected in series with a capacitor to develop an active-clamp circuit. A minimum frequency of the switching signal is determined by a second resistor during a heavy load condition.

12 Claims, 9 Drawing Sheets

CONTROL CIRCUIT FOR ACTIVE-CLAMP FLYBACK POWER CONVERTER WITH PROGRAMMABLE SWITCHING PERIOD

CROSS REFERENCE TO RELATED APPLICATIONS

This application claims the benefit of U.S. Provisional Application No. 61/840,073, filed on Jun. 27, 2013, the contents of which are incorporated herein by reference.

BACKGROUND OF THE INVENTION

1. Field of the Invention

The present invention relates to an active-clamp flyback power converter, and, more specifically, the present invention relates to a control circuit of the active-clamp flyback power converter.

2. Description of the Related Art

The traditional active-clamp circuit can only achieve zero-voltage switching at particular load condition. Besides, its high circulated current during light-load condition causes higher power loss problem. The related prior arts can be found in "Clamped Continuous Flyback Power Converter", U.S. Pat. No. 5,570,278; "Offset Resonance Zero Voltage Switching Flyback Converter" U.S. Pat. No. 6,069,803 and "Active-clamp Circuit for Quasi-resonant Flyback Power Converter", U.S. patent application 20110305048.

BRIEF SUMMARY OF THE INVENTION

The present invention proposes a control circuit for active-clamp flyback power converter. It can achieve zero-voltage switching at heavy load and achieve high-efficiency at the light load. The objective of the present invention is to provide a method and approach to ensure the active-clamp flyback power converter can achieve zero-voltage switching at heavy-load condition and can achieve high-efficiency during light-load condition.

The present invention proposes a control circuit of an active-clamp flyback power converter. The control circuit comprises a low-side transistor, a high-side transistor, a high-side driving circuit, a controller, and a charge-pump circuit. The low-side transistor is coupled to switch a transformer. The high-side transistor is connected in series with a capacitor to develop an active-clamp circuit. The active-clamp circuit is coupled in parallel with the transformer. The high-side driving circuit is coupled to drive the high-side transistor. The controller generates a switching signal and an active-clamp signal. The switching signal is coupled to drive the low-side transistor. The switching signal is generated in response to a feedback signal for regulating an output of the active-clamp flyback power converter. The active-clamp signal is coupled to the high-side driving circuit for controlling the high-side transistor. A pulse width of the active-clamp signal is determined by a first resistor. The active-clamp signal is enabled after the switching signal is disabled. The switching signal is enabled after the active-clamp signal is disabled. A minimum frequency of the switching signal is determined by a second resistor during a heavy load condition. The controller comprises a hysteresis bias generator and a capacitor. The hysteresis bias generator generates a hysteresis bias to adjust the feedback signal. The comparator has a light-load threshold to control the hysteresis bias. The comparator controls the hysteresis bias in response to a value of the feedback signal and the light-load threshold. The switching signal will be enabled in response to a pulse signal. The pulse signal is generated periodically by an oscillation circuit of the controller. The charge-pump circuit comprises a diode and a charge-pump capacitor. The diode is coupled to a supply voltage. The charge-pump capacitor is coupled to the diode in series. The charge-pump capacitor is connected to the high-side driving circuit.

The present invention also proposes a method for controlling an active-clamp flyback power converter. The method comprises steps of generating a switching signal in response to a feedback signal for switching a low-side transistor and regulating an output of the active-clamp flyback power converter; and generating an active-clamp signal after the switching signal is disabled. The low-side transistor is coupled to switch a transformer. The switching signal is coupled to drive the low-side transistor. The active-clamp signal is coupled to drive a high-side transistor. A pulse width of the active-clamp signal is determined by a first resistor. The high-side transistor is connected in series with a capacitor to develop an active-clamp circuit. The active-clamp circuit is coupled in parallel with the transformer. The active-clamp signal is enabled after the switching signal is disabled. The switching signal is enabled after the active-clamp signal is disabled. A minimum frequency of the switching signal is determined by a second resistor during a heavy load condition. The method further comprises: generating a hysteresis bias to adjust the feedback signal. The hysteresis bias is generated in response to a value of the feedback signal and a light-load threshold. The method further comprises generating a pulse signal periodically to enable the switching signal. The pulse signal is coupled to determine a maximum on-time of the switching signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
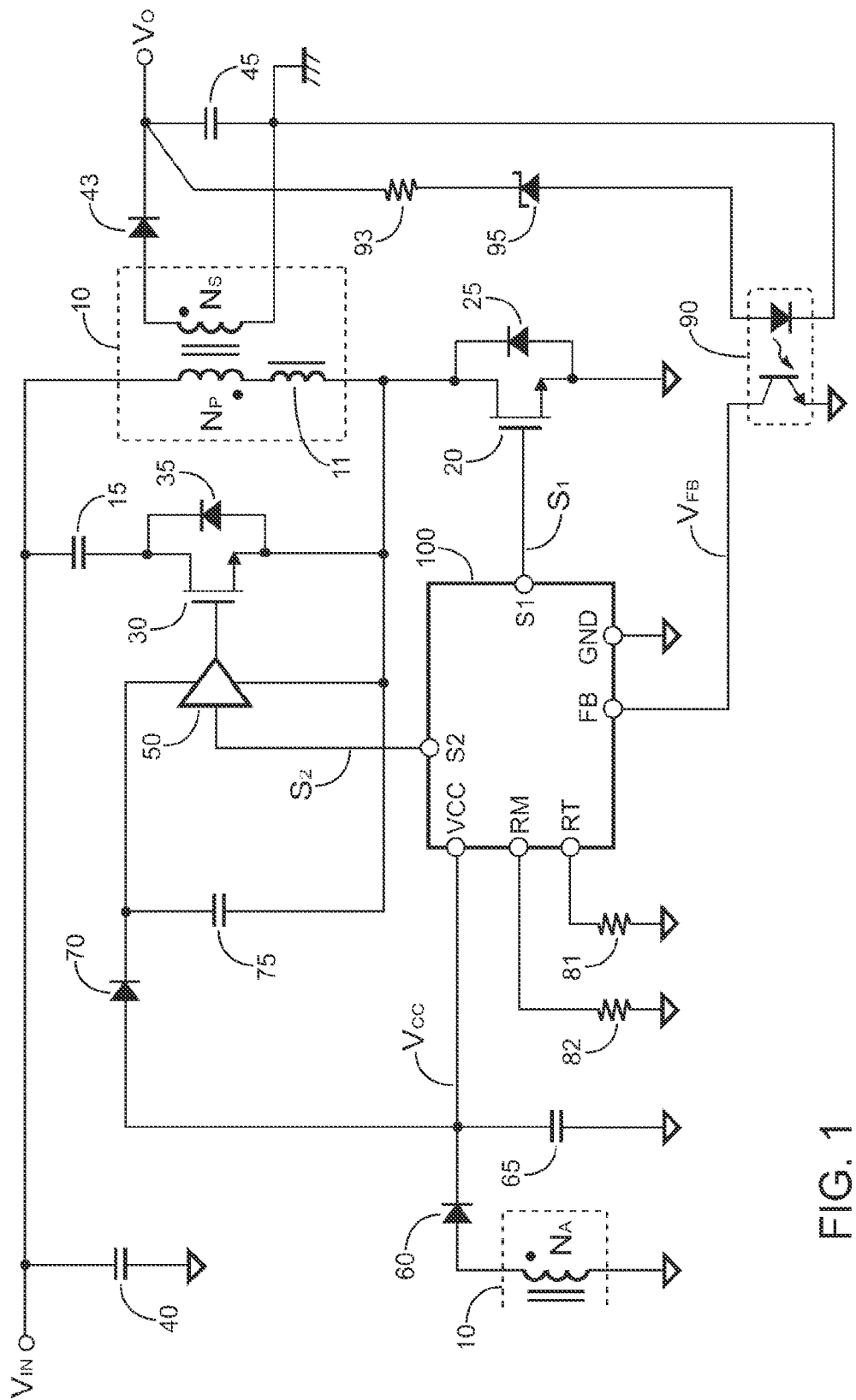
FIG. 1 shows an exemplary embodiment of a flyback power converter according to the present invention.

FIG. 1 shows an exemplary embodiment of a flyback power converter according to the present invention. A transformer 10 is coupled to receive an input voltage VIN of the power converter. A transistor (also referred to as "low-side transistor") 20 is coupled to switch a primary winding NP of the transformer 10. A controller 100 generates a switching signal S1 at a terminal S1, and the switching signal S1 is coupled to drive the transistor 20 for regulating an output voltage VO of the power converter. The switching signal S1 is generated in response to a feedback signal VFB at a terminal FB of the controller 100. The feedback signal VFB is correlated to the output voltage VO of the power converter. A secondary winding NS of the transformer 10 will produce the output voltage VO via a rectifier 43 and a capacitor 45. A resistor 93, a voltage regulator 95 (e.g. a zener diode), and an opto-coupler 90 develop a feedback circuit to generate the feedback signal VFB in response to the output voltage VO. The transformer 10 includes an auxiliary winding NA for generating a supply voltage VCC across a capacitor 65 via a rectifier 60. The supply voltage VCC is used to power the controller 100. A transistor (also referred to as "high-side transistor") 30 connected in series with a capacitor 15 develop an active-clamp circuit. The active-clamp circuit is connected in parallel with the primary winding NP of the transformer 10. When the transistor 20 is turned off, the energy of a leakage inductance 11 of the transformer 10 will be stored into the capacitor 15 via the transistor 30 and its body diode 35. A high-side driving circuit 50 is coupled to drive the transistor 30. A charge-pump circuit developed by a diode 70 and a capacitor 75 receives the supply voltage VCC and provides a power source to the high-side driving circuit 50. The capacitor 75 is connected with the diode 70 in series. In the embodiment of FIG. 1, the transistor 20, the controller 100, the high-side driving circuit 50, the active-clamp circuit, and the charge-pump circuit develop a control circuit.

The controller 100 generates an active-clamp signal $S_2$ at a terminal S2 for controlling the high-side driving circuit 50. The pulse width of the active-clamp signal $S_2$ is determined by the resistance of a resistor 81. The resistor 81 is connected to a terminal RT of the controller 100. The active-clamp signal $S_2$ can only be enabled once the switching signal $S_1$ is disabled. During a heavy-load condition, the switching signal $S_1$ will be enabled after the active-clamp signal $S_2$ is disabled. A resistor 82 is coupled to a terminal RM of the controller 100 for determining a minimum frequency (the maximum on-time) of the switching signal $S_1$ during the heavy-load condition.

FIG. 2A~FIG. 2D respectively show four states $T_1$~$T_4$ of a current flow of the power converter according to the present invention.

Figure 2A:
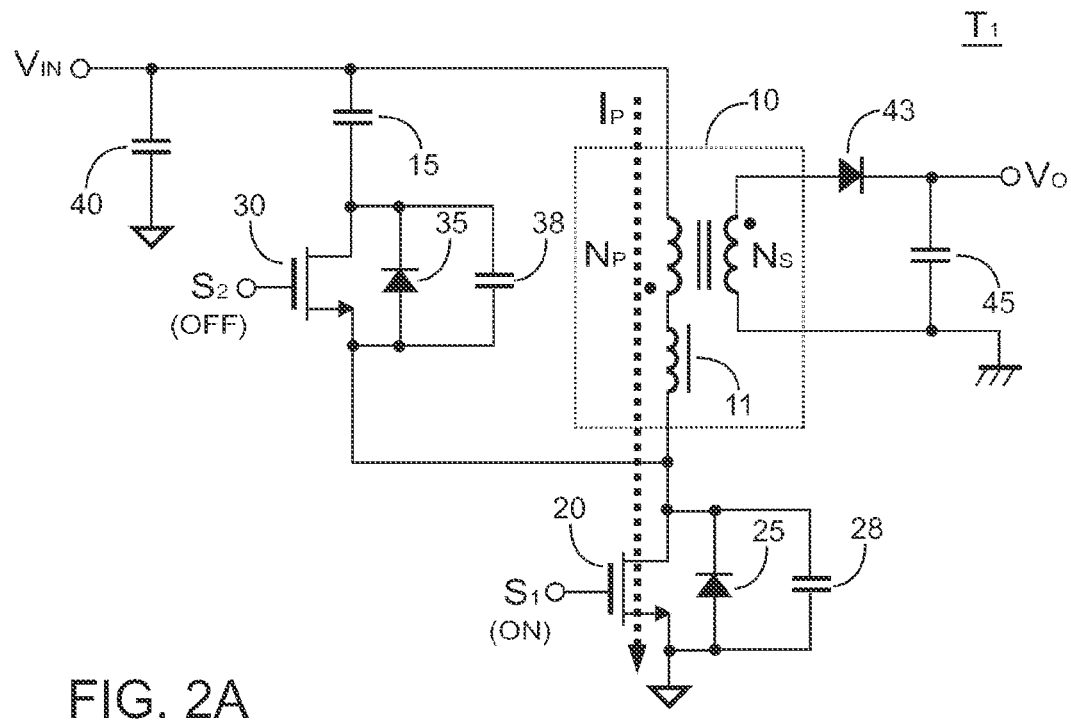
FIG. 2A~FIG. 2D respectively shows four states of a current flow of the power converter according to the present invention.

Referring to FIG. 2A, in the state $T_1$, the switching signal $S_1$ turns on (ON) the transistor 20. A current $I_P$ flows through the transformer 10 and stores the energy into the transformer 10. The energy also will be stored into the leakage inductance 11 of the transformer 10.

Figure 2B:
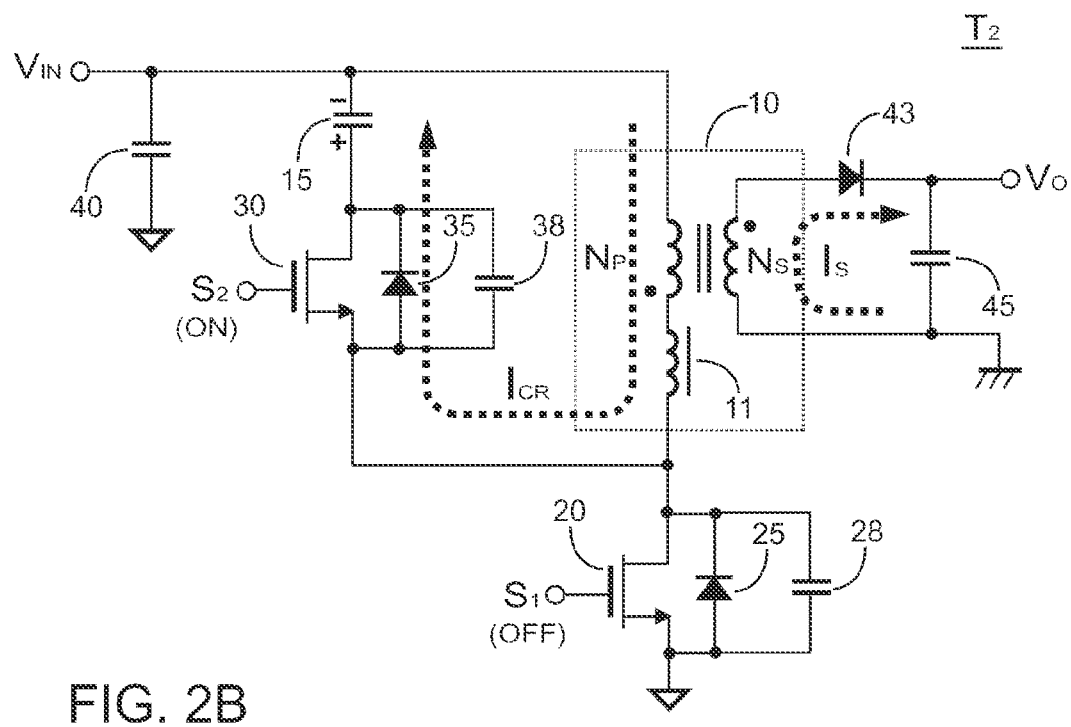

Referring to FIG. 2B, in the state $T_2$, the switching signal $S_1$ turns off (OFF) the transistor 20. The energy stored in the transformer 10 will be delivered to the output of the power converter through a current $I_S$ for generating the output voltage $V_O$. Besides, the energy in the transformer 10 and the leakage inductance 11 will be delivered to the capacitor 15 through the body diode 35 of the transistor 30. A circulated current $I_{CR}$ represents the energy that flows to the capacitor 15. After that, the active-clamp signal $S_2$ will turn on the transistor 30.

Figure 2C:
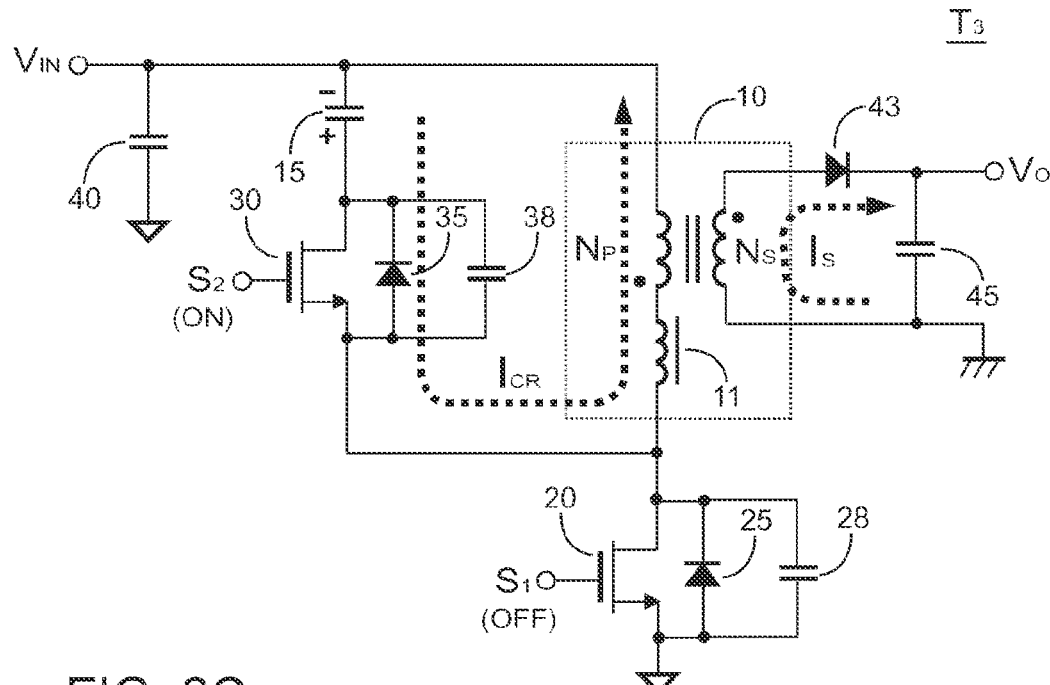

Referring to FIG. 2C, in the state $T_3$, the energy stored in capacitor 15 will be recycled to the transformer 10 and the leakage inductance 11 via the transistor 30. The capacitor 15 is discharged by the circulated current $I_{CR}$ via the leakage inductance 11. The leakage inductance 11 and the capacitor 15 form a resonant tank and determine its resonant frequency.

Figure 2D:
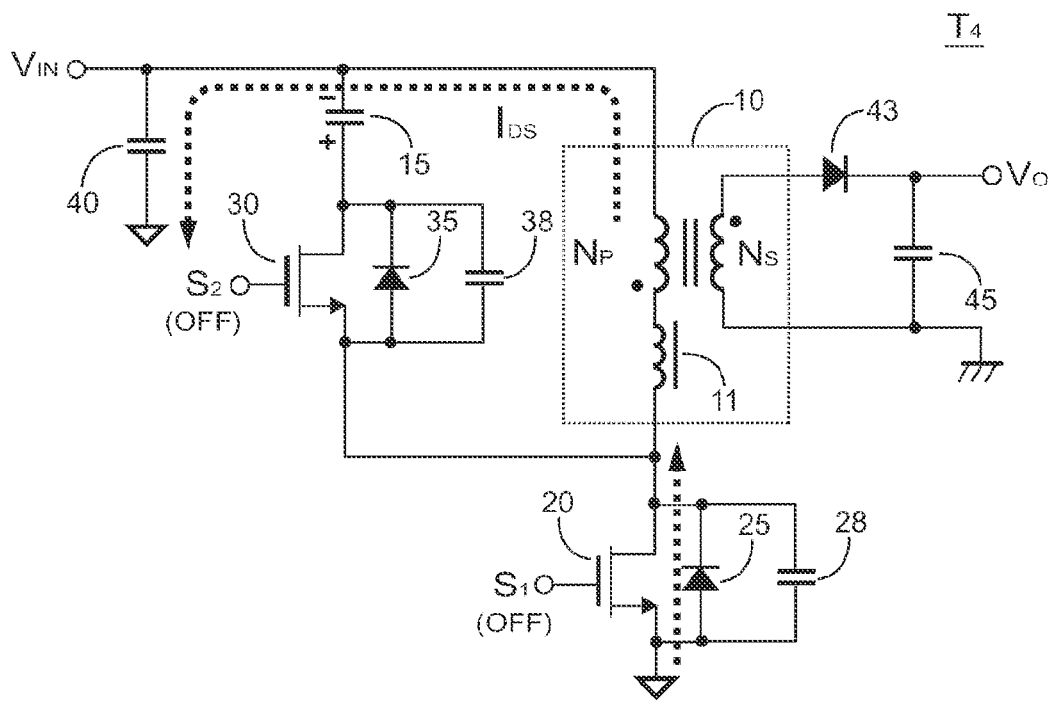

Referring to FIG. 2D, in state $T_4$, the active-clamp signal $S_2$ turns off the transistor 30. The energy stored in the leakage inductance 11 will be delivered to the input voltage $V_{IN}$ through a current $I_{DS}$. Meanwhile, the parasitic capacitor 28 of the transistor 20 will be discharged, and the body diode 25 of the transistor 20 can be turned on for achieving zero-voltage switching operation of the transistor 20 in the next switching cycle (state $T_1$).

Figure 3:
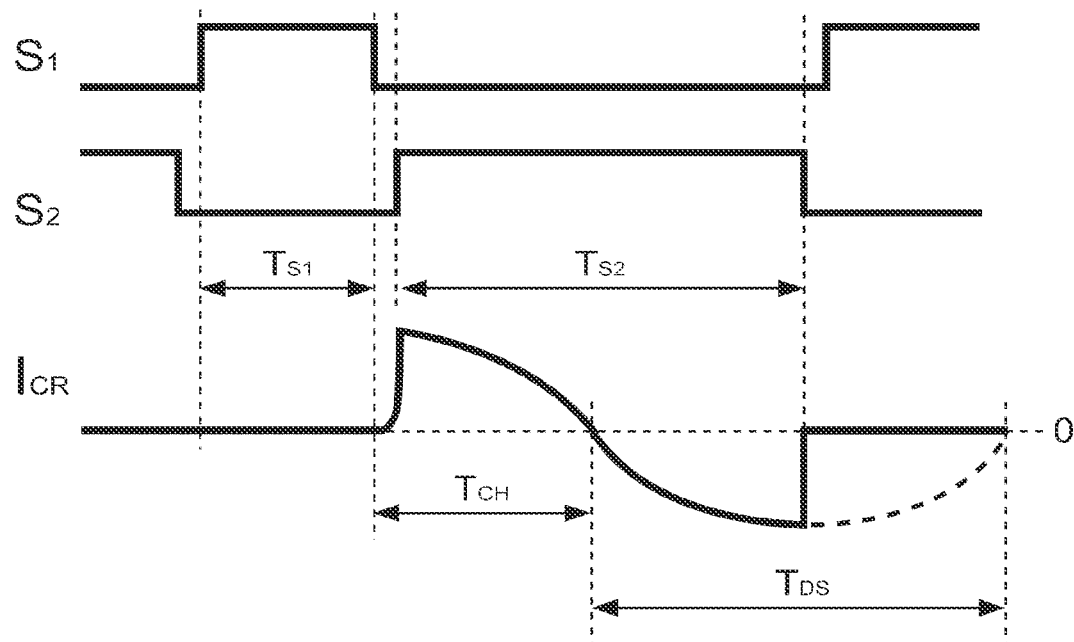
FIG. 3 shows waveforms of a switching signal, an active-clamp signal and a circulated current.

FIG. 3 shows the waveforms of the switching signal $S_1$, the active-clamp signal $S_2$ and the circulated current $I_{CR}$. A period $T_{CH}$ represents the period of the state $T_2$. A period $T_{DS}$ represents the maximum period of the state $T_3$. $T_{S1}$ represents the pulse width of the switching signal $S_1$. $T_{S2}$ represents the pulse width of the active-clamp signal $S_2$. In order to start the state $T_3$ (the period $T_{DS}$), the active-clamp signal $S_2$ must be enabled before the end of the period $T_{CH}$. To achieve the zero-voltage switching, the active-clamp signal $S_2$ must be turned off before the end of the period $T_{DS}$. Both of the period $T_{CH}$ and the period $T_{DS}$ are determined by the resonant frequency of the resonant tank.

Figure 4:
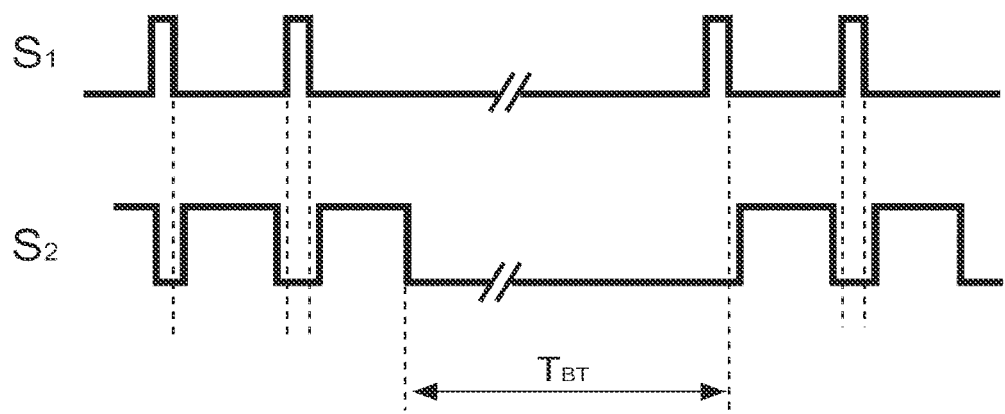
FIG. 4 shows burst waveforms of the switching signal and the active-clamp signal.

FIG. 4 shows the burst waveforms of the switching signal $S_1$ and the active-clamp signal $S_2$. The period $T_{BT}$ is the burst period.

Figure 5:
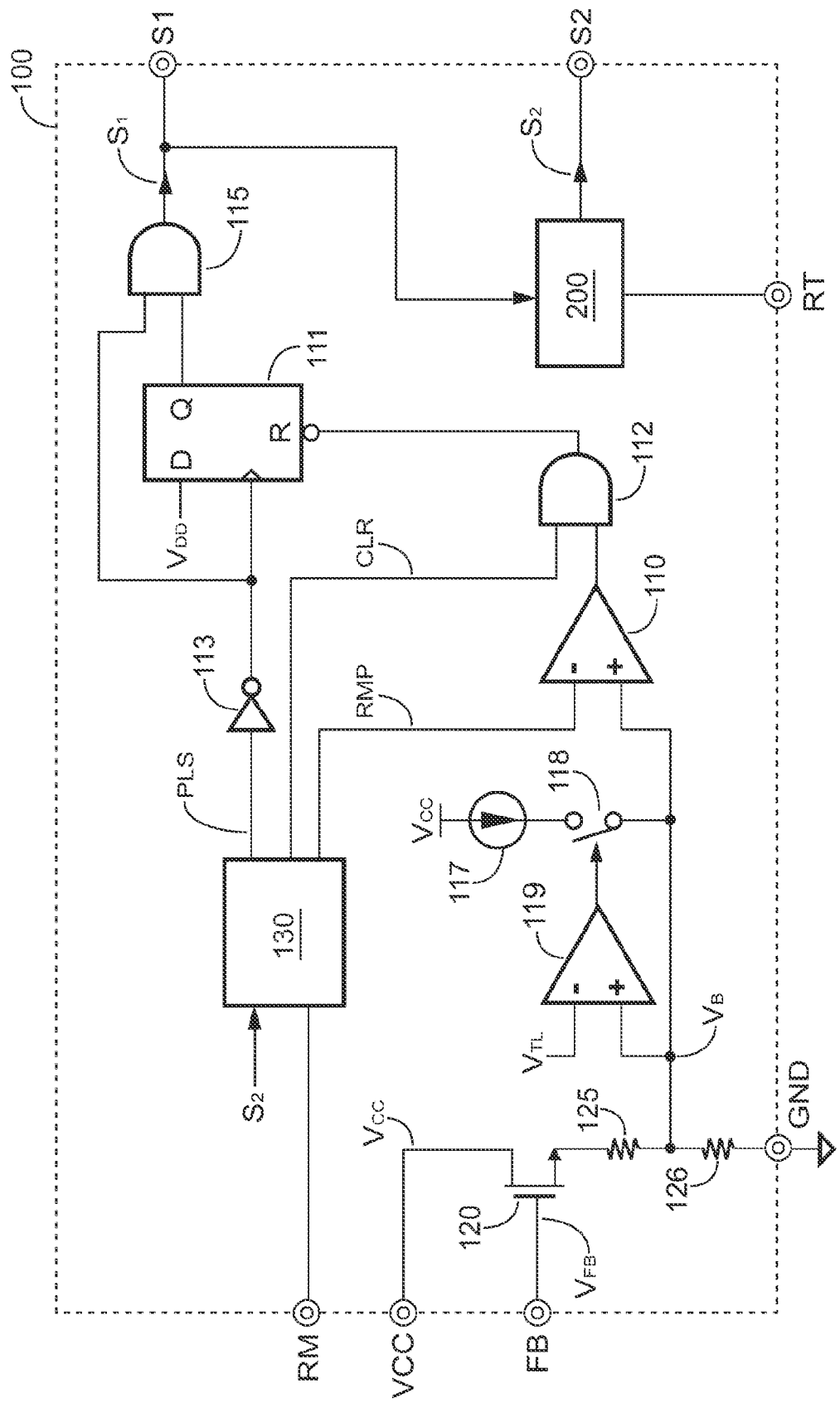
FIG. 5 shows an exemplary embodiment of a controller of the power converter according to the present invention.

FIG. 5 shows an exemplary embodiment of the controller 100 of the power converter according to the present invention. The controller 100 includes an oscillation circuit 130 which generates a pulse signal PLS, a ramp signal RMP, and a clear signal CLR. The pulse signal PLS is coupled to enable the switching signal S1 via an inverter 113, a flip-flop 111, and an AND gate 115. The active-clamp signal S2 and the resistor 82 (shown in FIG. 1) are coupled to the oscillation circuit 130 for generating the switching signal S1. Therefore, the switching signal S1 can be enabled once the active-clamp signal S2 is disabled. The resistor 82 determines the minimum switching frequency (the lowest switching frequency) of the switching signal S1. The resistor 81 (shown in FIG. 1) and the switching signal S1 are coupled to a signal generation circuit 200 to generate the active-clamp signal S2. The active-clamp signal S2 can be enabled once the switching signal S1 is disabled. A level-shift transistor 120 and resistors 125 and 126 generate a signal VB in response to the feedback signal VFB. The ramp signal RMP is compared with the signal VB in a comparator 110 to generate a signal coupled to disable the switching signal S1 via an AND gate 112 for the pulse width modulation (PWM) operation. The clear signal CLR generated by the oscillation circuit 130 is coupled to reset the flip-flop 111 for disabling the switching signal S1 and limiting the maximum on-time of the switching signal S1.

A comparator 119 is used to compare the signal $V_B$ with a light-load threshold $V_{TL}$. When the signal $V_B$ is lower than the light-load threshold $V_{TL}$, a hysteresis bias will be decreased from the current level of the signal $V_B$. A hysteresis bias generator including the resistors 125 and 126 and a current source 117 generates the hysteresis bias which is determined by the magnitude of the current source 117 and the equivalent resistance of the resistors 125 and 126. A switch 118 controlled by the comparator 119 turns on/off the current source 117. If the signal $V_B$ is higher than the light-load threshold $V_{TL}$, the hysteresis bias will be added to the signal $V_B$. When the signal $V_B$ is lower than the light-load threshold $V_{TL}$, the hysteresis bias will be decreased from the current level of the signal $V_B$. Therefore, through the feedback loop, this hysteresis bias will cause a burst switching to reduce the switching frequency of the switching signal $S_1$ and improve the light load efficiency for the light load condition (the signal $V_B$ is lower than the light-load threshold $V_{TL}$).

Figure 6:
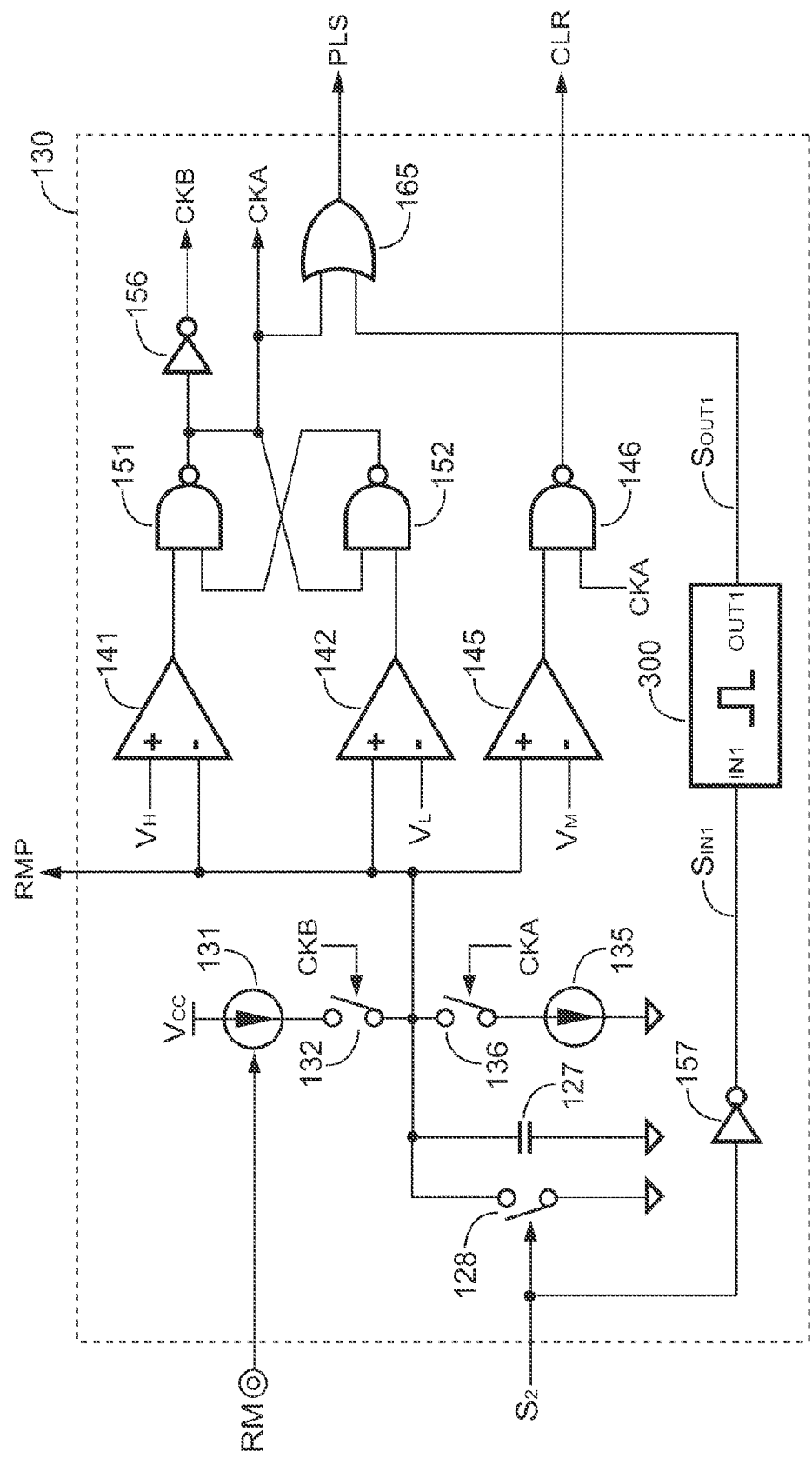
FIG. 6 shows an embodiment of an oscillation circuit of the controller according to the present invention.

FIG. 6 shows an exemplary embodiment of the oscillation circuit 130 of the controller 100 according to the present invention. Current sources 131 and 135 are utilized to charge and discharge a capacitor 127 via switches 132 and 136, respectively. The ramp signal RMP is generated across the capacitor 127. The ramp signal RMP is further coupled to comparators 141, 142, and 145. The comparator 141 has a trip-point voltage $V_H$. The comparator 142 has a trip-point voltage $V_L$. The comparator 145 has a threshold voltage $V_M$. The level of the trip-point voltage $V_H$ is greater than that of the threshold voltage $V_M$. The level of the threshold voltage $V_M$ is greater than that of the trip-point voltage $V_L$. NAND gates 151 and 152 form a latch circuit connected to receive output signals of comparators 141 and 142. The latch circuit and an inverter 156 generate clock signals CKA and CKB. The clock signal CKA is applied to control the switch 136 for discharging the capacitor 127. The clock signal CKB is utilized to control the switch 132 for charging the capacitor 127. An output of the comparator 145 and the clock signal CKA generate the clear signal CLR via a NAND gate 146. The falling edge of the active-clamp signal $S_2$ will generate a one-shot signal at an input of an OR gate 165 via an inverter 157 and a pulse generator 300. Another input of the OR gate 165 receives the clock signal CKA. The one-shot signal and the clock signal CKA both generate the pulse signal PLS through the OR gate 165. Therefore, the pulse signal PLS will be generated whenever the active-clamp signal $S_2$ is disabled. Furthermore, the pulse signal PLS will be generated in response to the clock signal CKA when the maximum oscillation period of the ramp signal RMP is reached. Since the clear signal CLR is generated in response to the clock signal CKA which is correlated to the pulse signal PLS, the pulse signal PLS will therefore limit the maximum on-time of the switching signal $S_1$. The resistance of the resistor 82 (shown in FIG. 1) which is connected to the terminal RM controls the magnitude of the current source 131. Therefore, the resistor 82 is used for determining the maximum oscillation period of the ramp signal RMP.

Figure 7:
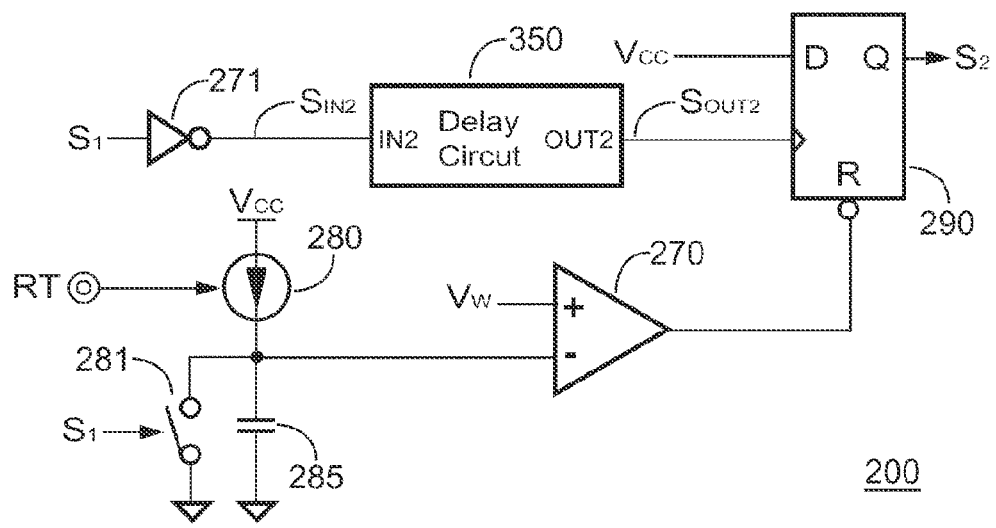
FIG. 7 shows an embodiment of a signal generation circuit of the controller according to the present invention.

FIG. 7 shows an exemplary embodiment of the signal generation circuit 200 of the controller 100 according to the present invention. The switching signal $S_1$ is coupled to generate the active-clamp signal $S_2$ via an inverter 271, a delay circuit 350, and a flip-flop 290. Therefore, when the switching signal $S_1$ is disabled, the active-clamp signal $S_2$ will be enabled after a delay time determined by the delay circuit 350. Once the switching signal $S_1$ is disabled, a switch 281 will be turned off. A current source 280 will start to charge a capacitor 285. A comparator 270 is coupled to disable the active-clamp signal $S_2$ via the flip-flop 290 when the voltage across the capacitor 285 is higher than a threshold $V_W$. The resistance of the resistor 81 (shown in FIG. 1) which is connected to the terminal RT controls the magnitude of the current source 280. Thus, the resistor 81, the capacitor 285, and the threshold $V_W$ determine the pulse width of the active-clamp signal $S_2$. The resistor 81 is applied to determine the pulse width $T_{S2}$ of the active-clamp signal $S_2$ for achieving zero-voltage switching. The pulse width $T_{S2}$ must be selected as: $T_{S2} > T_{CH}$ and $T_{S2} < "T_{CH} + T_{DS}"$ (shown in FIG. 3).

Figure 8A:
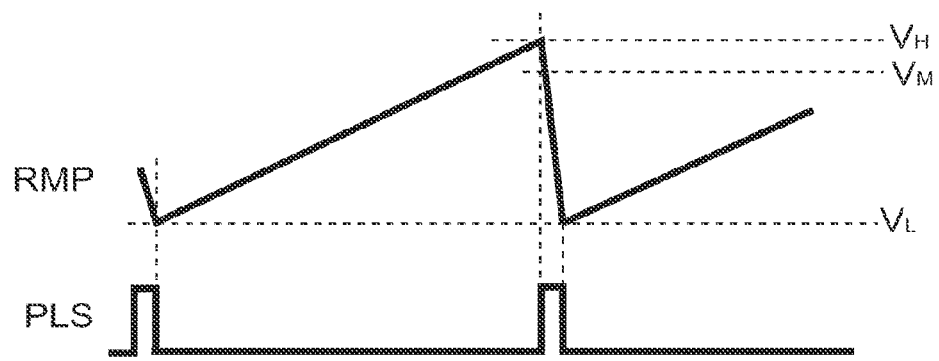
FIG. 8A shows waveforms of a ramp signal and a pulse signal.

FIG. 8A shows the waveforms of the ramp signal RMP and the pulse signal PLS. The pulse signal PLS in FIG. 8A is generated in response to the clock signal CKA as shown in FIG. 6.

Figure 8B:
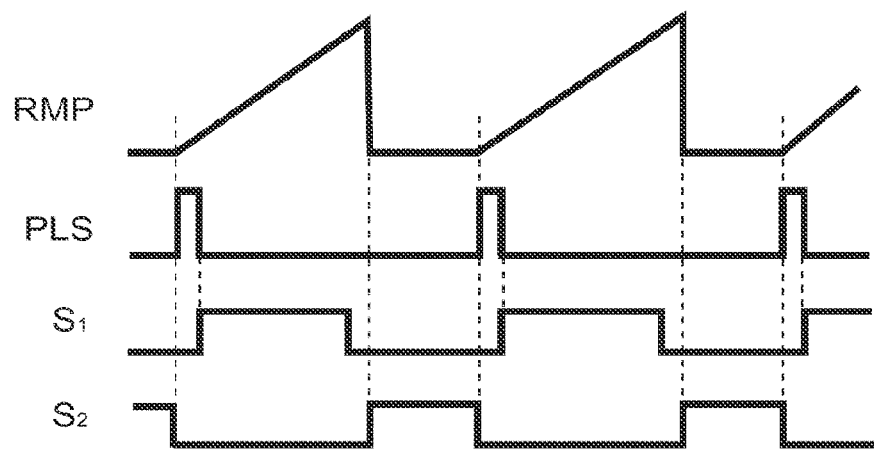
FIG. 8B shows waveforms of the ramp signal, the pulse signal, the switching signal and the active-clamp signal.

FIG. 8B shows the waveforms of the ramp signal RMP, the pulse signal PLS, the switching signal $S_1$, and the active-clamp signal $S_2$. The active-clamp signal $S_2$ will be generated after the switching signal $S_1$ is disabled. The switching signal $S_1$ will be generated after the active-clamp signal $S_2$ is disabled. That is, the switching signal $S_1$ and the active-clamp signal $S_2$ are generated in an interleaved manner without being enabled at the same time. The pulse signal PLS is generated periodically to enable the switching signal $S_1$ in case the switching signal $S_1$ is not enabled during the burst switching mode. The pulse signal PLS in FIG. 8B is generated in response to the on-shot signal at an output of the pulse generator 300. Furthermore, the maximum on-time of the switching signal $S_1$ is limited by the maximum period of the ramp signal RMP.

Figure 9A:
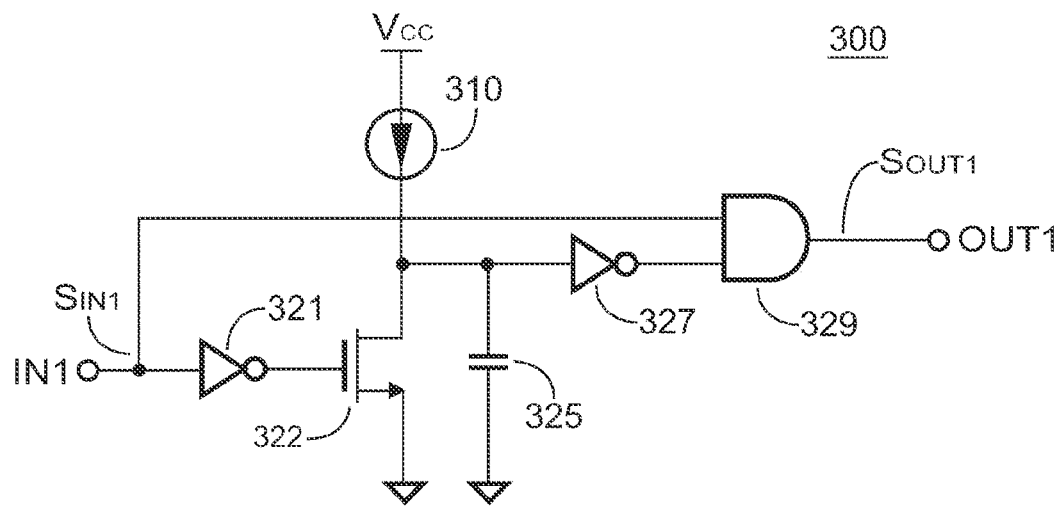
FIG. 9A shows a schematic circuit of a pulse generator of the oscillation circuit.

FIG. 9A shows a schematic circuit of the pulse generator 300 of the oscillation circuit 130. Referring to FIG. 9A, a current source 310 is coupled to charge a capacitor 325. A transistor 322 is coupled to discharge the capacitor 325. A signal $S_{IN1}$ at a terminal IN1 of the pulse generator 300 is coupled to control the transistor 322 through an inverter 321. The signal $S_{IN1}$ is further coupled to an input of an AND gate 329. Another input of the AND gate 329 is coupled to the capacitor 325 via an inverter 327. A pulse width of an output pulse signal $S_{OUT1}$ at a terminal OUT1 of the pulse generator 300 is determined by the current of the current source 310 and the capacitance of the capacitor 325. In the embodiment, the signal $S_{IN1}$ received by the pulse generator 300 of FIG. 9A is provided from the output of the inverter 157 (shown in FIG. 6), and the output pulse signal $S_{OUT1}$ is provided to the input of the OR gate 165 (shown in FIG. 6) to serve as the one-shot signal.

Figure 9B:
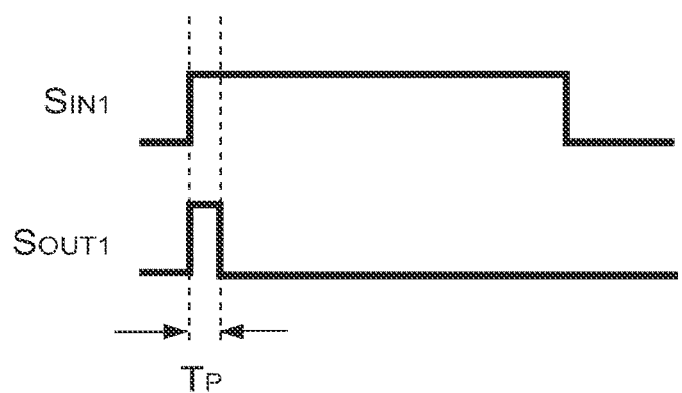
FIG. 9B shows waveforms of an input signal and an output signal of the pulse generator in FIG. 9A.

FIG. 9B shows the waveforms of the input signal $S_{IN1}$ and the output pulse signal $S_{OUT1}$ of the pulse generator 300. $T_P$ represents the pulse width of the output pulse signal $S_{OUT1}$.

Figure 10A:
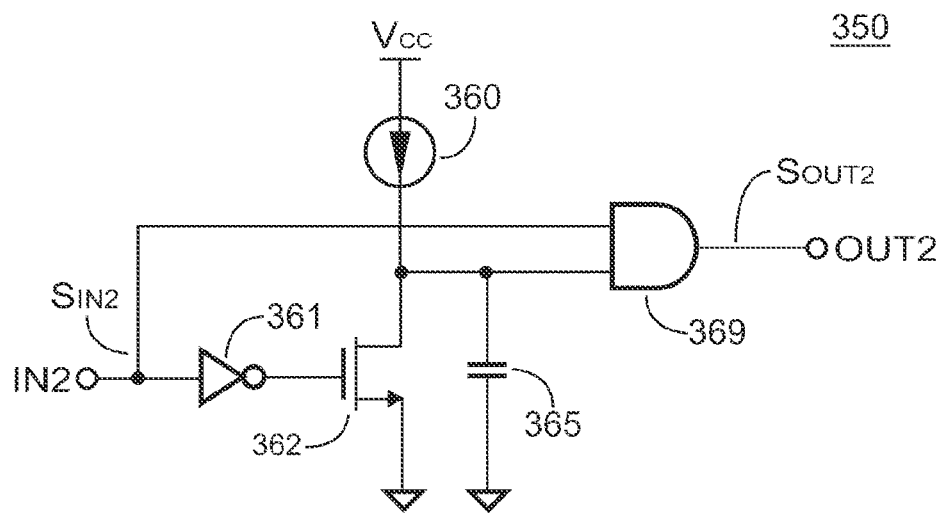
FIG. 10A shows a schematic circuit of a delay circuit of the signal generation circuit.

FIG. 10A shows a schematic circuit of the delay circuit 350 of the signal generation circuit 200. Referring to FIG. 10A, a current source 360 is coupled to charge a capacitor 365. A transistor 362 is coupled to discharge the capacitor 365. A signal $S_{IN2}$ at a terminal IN2 of the delay circuit 350 is coupled to control the transistor 362 through an inverter 361. The signal $S_{IN2}$ is further coupled to an input of an AND gate 369. Another input of the AND gate 369 is coupled to the capacitor 365. A pulse width of an output pulse signal $S_{OUT2}$ at a terminal OUT2 of the delay circuit 350 is determined by the current of the current source 360 and the capacitance of the capacitor 365. In the embodiment, the signal $S_{IN2}$ received by the delay circuit 350 of FIG. 10A is provided from the output of the inverter 271 (shown in FIG. 7), and the output pulse signal $S_{OUT2}$ is provided to the flip-flop 290 (shown in FIG. 7) for generating the active-clamp signal $S_2$.

Figure 10B:
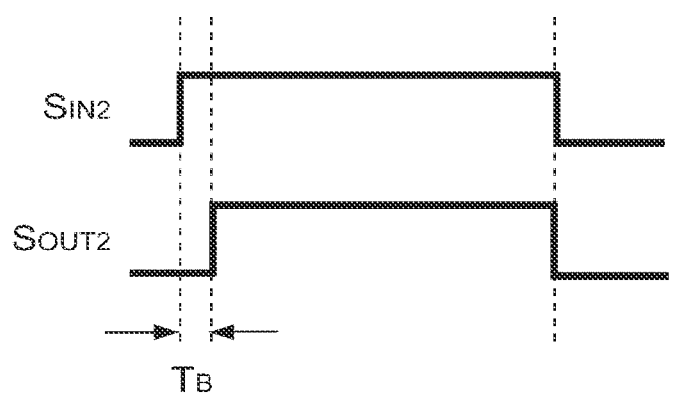
FIG. 10B shows the waveforms of an input signal and an output signal of the delay circuit in FIG. 10A.

FIG. 10B shows the waveforms of the input signal $S_{IN2}$ and the output signal $S_{OUT2}$ of the delay circuit 350. $T_B$ represents the delay time generated by the delay circuit 350.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of an active-clamp flyback power converter comprising:
    a low-side transistor coupled to switch a transformer;
    a high-side transistor connected in series with a capacitor to develop an active-clamp circuit, wherein said active-clamp circuit is coupled in parallel with said transformer;
    a high-side driving circuit coupled to drive said high-side transistor; and
    a controller generating a switching signal and an active-clamp signal,
    wherein said switching signal is coupled to drive said low-side transistor, and said switching signal is generated in response to a feedback signal for regulating an output of said active-clamp flyback power converter, and
    wherein said active-clamp signal is coupled to said high-side driving circuit for controlling said high-side transistor, said active-clamp signal comprises a pulse having a rising edge and a falling edge, and a time point of said falling edge is determined by a first resistor.

2. The control circuit as claimed in claim 1, wherein said active-clamp signal is enabled after said switching signal is disabled, and said switching signal can be enabled after said active-clamp signal is disabled.

3. The control circuit as claimed in claim 1, wherein a minimum frequency of said switching signal is determined by a second resistor during a heavy load condition.

4. The control circuit as claimed in claim 1, wherein the controller comprises:
    a hysteresis bias generator for generating a hysteresis bias to adjust said feedback signal; and
    a comparator having a light-load threshold to control said hysteresis bias,
    wherein said comparator controls said hysteresis bias in response to a value of said feedback signal and said light-load threshold.

5. The control circuit as claimed in claim 1, wherein said switching signal will be enabled in response to a pulse signal, and said pulse signal is generated periodically by an oscillation circuit of said controller.

6. The control circuit as claimed in claim 1 further comprising a charge-pump circuit, wherein the charge-pump circuit comprises:
    a diode coupled to a supply voltage; and
    a charge-pump capacitor coupled to said diode in series;
    wherein said charge-pump capacitor is connected to said high-side driving circuit.

7. A method for controlling an active-clamp flyback power converter comprising:
    generating a switching signal in response to a feedback signal for switching a low-side transistor and regulating an output of said active-clamp flyback power converter; and
    generating an active-clamp signal after said switching signal is disabled;
    wherein said low-side transistor is coupled to switch a transformer, and said switching signal is coupled to drive said low-side transistor,
    wherein said active-clamp signal is coupled to drive a high-side transistor, said active-clamp signal comprises a pulse having a rising edge and a falling edge, and a time point of said falling edge is determined by a first resistor, and
    wherein said high-side transistor is connected in series with a capacitor to develop an active-clamp circuit, and the active-clamp circuit is coupled in parallel with said transformer.

8. The method as claimed in claim 7, wherein said active-clamp signal is enabled after said switching signal is disabled, and said switching signal is enabled after said active-clamp signal is disabled.

9. The method as claimed in claim 7, wherein a minimum frequency of said switching signal is determined by a second resistor during a heavy load condition.

10. The method as claimed in claim 7 further comprising:
    generating a hysteresis bias to adjust said feedback signal,
    wherein said hysteresis bias is generated in response to a value of said feedback signal and a light-load threshold.

11. The method as claimed in claim 7 further comprising:
    generating a pulse signal periodically to enable said switching signal.

12. The method as claimed in claim 11, wherein said pulse signal is coupled to determine a maximum on-time of said switching signal.

* * * * *